(12) United States Patent
Jackson

(10) Patent No.: US 11,323,664 B1
(45) Date of Patent: May 3, 2022

(54) WEARABLE ELECTRONIC DEVICE FOR PROVIDING AUDIO OUTPUT AND CAPTURING VISUAL MEDIA

(71) Applicant: I Can See You Inc., The New Technology, Turlock, CA (US)

(72) Inventor: Annette Jackson, Turlock, CA (US)

(73) Assignee: I Can See You Inc., The New Technology, Turlock, CA (US)

( * ) Notice: Subject to any disclaimer, the term of this patent is extended or adjusted under 35 U.S.C. 154(b) by 0 days.

(21) Appl. No.: 17/362,994

(22) Filed: Jun. 30, 2021

Related U.S. Application Data

(60) Provisional application No. 63/135,298, filed on Jan. 8, 2021.

(51) Int. Cl.
| | |
|---|---|
| *H04N 5/38* | (2006.01) |
| *H04N 7/18* | (2006.01) |
| *H04N 5/232* | (2006.01) |
| *H04R 1/10* | (2006.01) |
| *H04N 5/225* | (2006.01) |

(Continued)

(52) U.S. Cl.
CPC ........... *H04N 7/181* (2013.01); *H04N 5/2252* (2013.01); *H04N 5/2257* (2013.01); *H04N 5/23206* (2013.01); *H04N 5/247* (2013.01); *H04N 5/38* (2013.01); *H04R 1/08* (2013.01); *H04R 1/105* (2013.01); *H04R 1/1016* (2013.01); *H04R 1/1041* (2013.01); *H04R 2420/07* (2013.01)

(58) Field of Classification Search
CPC ............ G01C 21/3476; G02B 27/0172; G02B 27/0093; G02B 27/01; G02C 5/20; G06F 3/0487; G06F 3/165; G06F 1/1686; G06F 1/1694; G06F 3/011; G06F 3/0362; G06N 20/00; H04N 5/2252; H04N 5/2257; H04N 5/23206; H04N 5/247; H04N 5/38; H04N 7/181; H04N 5/225; H04R 1/08; H04R 1/1016; H04R 1/1041; H04R 1/105; H04R 2420/07; H04R 1/1091; H04R 1/46; H04W 4/80; F41G 3/165; G06V 20/30; G06V 40/174; H04M 1/05
USPC ................. 345/173; 348/46, 158; 381/74, 58
See application file for complete search history.

(56) References Cited

U.S. PATENT DOCUMENTS

| | | | |
|---|---|---|---|
| 9,759,917 B2 | 9/2017 | Osterhout et al. | |
| 10,061,352 B1 * | 8/2018 | Trail | ........................ H04R 1/08 |

(Continued)

*Primary Examiner* — Gerald Gauthier
(74) *Attorney, Agent, or Firm* — Kanika Radhakrishnan; Evergreen Valley Law Group

(57) ABSTRACT

Embodiments of the present disclosure provide a wearable electronic device for providing audio output and capturing a visual media. The wearable electronic device includes a neckband including a pair of arms coupled by a central portion therebetween, and at least one image sensor disposed in the neckband. Further, the wearable electronic device includes a processor operatively coupled to a communication interface, and is configured to at least receive a control command through an application, for capturing the image data of a surrounding environment of the user. The processor is configured to trigger the at least one image sensor for capturing the image data of the surrounding environment of the user in real-time. Further, the processor transmits the image data being captured by the at least one image sensor in real-time, to the user device of the user for enabling the user to view the visual media of the surrounding environment.

20 Claims, 9 Drawing Sheets

(51) Int. Cl.
*H04N 5/247* (2006.01)
*H04R 1/08* (2006.01)

(56) References Cited

U.S. PATENT DOCUMENTS

| | | | |
|---|---|---|---|
| 10,390,140 B2* | 8/2019 | Seo | H04R 1/1041 |
| 10,466,510 B2 | 11/2019 | Abreu | |
| 10,539,787 B2 | 1/2020 | Haddick et al. | |
| 10,852,838 B2 | 5/2020 | Bradski et al. | |
| 10,757,491 B1* | 8/2020 | Jackson | G06F 3/0362 |
| 10,873,798 B1* | 12/2020 | Jackson | H04R 1/46 |
| 11,017,431 B2* | 5/2021 | Gotoh | G06Q 30/0256 |
| 11,055,356 B2 | 7/2021 | Ritchey et al. | |
| 2009/0086015 A1* | 4/2009 | Larsen | F41G 3/165 |
| | | | 348/46 |
| 2011/0096168 A1* | 4/2011 | Siann | H04N 7/183 |
| | | | 348/158 |
| 2014/0233752 A1* | 8/2014 | Seo | H04M 1/035 |
| | | | 381/74 |
| 2015/0230022 A1* | 8/2015 | Sakai | H04R 1/1041 |
| | | | 381/58 |
| 2015/0264474 A1* | 9/2015 | Seo | B60R 1/062 |
| | | | 381/74 |
| 2015/0309316 A1 | 10/2015 | Osterhout et al. | |
| 2016/0026873 A1* | 1/2016 | Wexler | G06F 1/18 |
| | | | 348/158 |
| 2016/0098138 A1* | 4/2016 | Park | G06F 1/1686 |
| | | | 345/173 |
| 2016/0274357 A1* | 9/2016 | Joo | H04N 5/2353 |
| 2017/0013346 A1* | 1/2017 | Lee | H04W 4/80 |
| 2017/0023971 A1* | 1/2017 | Lee | A44C 5/0053 |
| 2017/0280223 A1* | 9/2017 | Cavarra | G06F 3/011 |
| 2017/0345215 A1* | 11/2017 | Khedkar | G06F 3/0487 |
| 2018/0048953 A1* | 2/2018 | Park | H04R 1/1033 |
| 2018/0152795 A1* | 5/2018 | Lee | G10K 11/17873 |
| 2019/0073090 A1* | 3/2019 | Parkinson | G02B 27/0176 |
| 2019/0101984 A1* | 4/2019 | Talati | A61B 5/6822 |
| 2021/0152916 A1* | 5/2021 | Kohler | H04R 1/1041 |
| 2021/0169417 A1 | 6/2021 | Burton | |
| 2022/0020390 A1* | 1/2022 | Ogawa | G10L 25/63 |

\* cited by examiner

WEARABLE ELECTRONIC DEVICE FOR PROVIDING AUDIO OUTPUT AND CAPTURING VISUAL MEDIA

TECHNICAL FIELD

The present disclosure relates to wearable electronic devices and, more particularly relates, to a wearable audio output device (i.e. earphones) integrated with image capturing sensor(s) for capturing a surrounding environment of a user while wearing the audio output device around a neck of the user.

BACKGROUND

In recent past, portable camera equipment (e.g., Handycam, DigiCam, Camcorder) have been widely used by users for capturing images or video recording. In general, cameras are handheld by people for capturing the images. However, the handheld cameras may cause discomfort for a user during movement while capturing the images due to bulky camera equipment. This may lead to a bad quality image of the event being captured. Additionally, the user of the handheld camera is required to connect an external storage for transferring the recorded content stored on a storage device within the camera. It is relatively cumbersome and significantly limits the activities in which the user recording the video may participate.

Due to technological advancements, hands-free cameras are developed for capturing images when the user is moving, without the user having to manually operate the camera. However, such hands-free cameras provide limited accessibility for recording and documenting of a users' experience, often from the similar point of view (or Field of view (FOV)) of the user. Moreover, the hands-free cameras may have cumbersome configurations of discrete components which are impractical for everyday use by the general public.

Therefore, there is a need for a wearable portable camera equipment to overcome one or more limitations stated above in addition to providing other technical advantages.

SUMMARY

Various embodiments of the present disclosure provide a wearable electronic device with integrated audio output and image capturing functionalities.

In an embodiment, a wearable electronic device for providing audio output and capturing a visual media is disclosed. The wearable electronic device includes a neckband including a pair of arms coupled by a central portion therebetween. Each arm of the pair of arms includes an earpiece for providing audio output signals. The wearable electronic device includes at least one image sensor disposed in the neckband. Further, the wearable electronic device includes a communication interface configured to enable a wireless communication for transmitting and receiving data between the wearable electronic device and a user device associated with a user, and a processor operatively coupled to the communication interface. The processor is configured to at least receive a control command through an application associated with the wearable electronic device that is installed in the user device, for capturing the image data of a surrounding environment of the user. The processor is further configured to trigger the at least one image sensor for capturing the image data of the surrounding environment of the user in real-time, while the wearable electronic device being worn by the user. The image data corresponds to the visual media of the surrounding environment of the user. Further, the processor is configured to transmit via the communication interface, the image data being captured by the at least one image sensor in real-time, to the user device of the user for enabling the user to view the visual media of the surrounding environment.

In another embodiment, a method for controlling a wearable electronic device is disclosed. The method performed by a processor of the wearable electronic device includes receiving a control command through an application associated with the wearable electronic device that is installed in a user device, for capturing an image data of a surrounding environment of a user. The method further includes triggering at least one image sensor of the wearable electronic device for capturing the image data of the surrounding environment of the user in real-time, while the wearable electronic device being worn by the user. The image data corresponds to a visual media of the surrounding environment of the user. Further, the method includes transmitting the image data being captured by the at least one image sensor in real-time, to the user device of the user for enabling the user to view the visual media of the surrounding environment.

In yet another embodiment, wearable electronic device for providing audio output and capturing a visual media is disclosed. The wearable electronic device includes a neckband including a pair of arms coupled by a central portion therebetween. Each arm of the pair of arms includes an earpiece for providing audio output signals. The wearable electronic device includes at least one image sensor. The at least one image sensor includes a first image sensor disposed in a housing of the earpiece of each arm of the pair of arms of the neckband, and a second image sensor disposed in the central portion and positioned towards a posterior end of the central portion of the neckband. Further, the wearable electronic device includes a communication interface configured to enable a wireless communication for transmitting and receiving data between the wearable electronic device and a user device associated with a user, and a processor operatively coupled to the communication interface. The processor is configured to at least receive a control command through an application associated with the wearable electronic device that is installed in the user device, for capturing the image data of a surrounding environment of the user. The processor is further configured to trigger the at least one image sensor for capturing the image data of the surrounding environment of the user in real-time, while the wearable electronic device being worn by the user. The image data corresponds to the visual media of the surrounding environment of the user. Further, the processor is configured to transmit via the communication interface, the image data being captured by the at least one image sensor in real-time, to the user device of the user for enabling the user to view the visual media of the surrounding environment.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
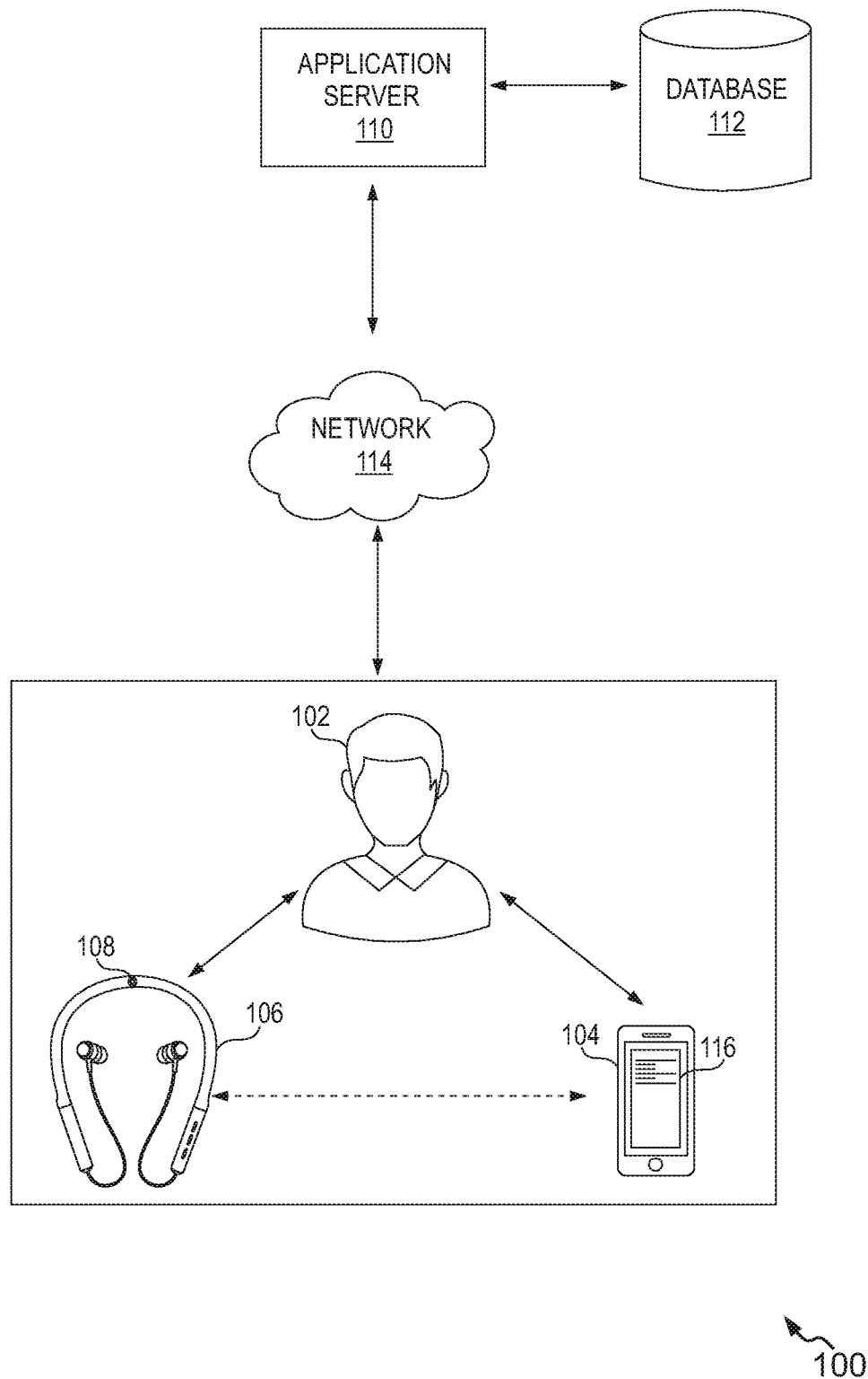
FIG. 1 illustrates an example representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure:

The term "image data" includes any form of data retrieved from optical signals in the near-infrared, infrared, visible, and ultraviolet spectrums. The image data may include video clips and/or photographs.

Overview

Various embodiments of the present disclosure provide a wearable electronic device with integrated audio output and image capturing functionalities. In an embodiment, the wearable electronic device includes a neckband including a pair of arms coupled by a central portion therebetween. Each arm of the pair of arms including an earpiece for providing audio output signals. The wearable electronic device further includes at least one image sensor disposed in the neckband. The at least one image sensor includes a first image sensor disposed in a housing of the earpiece of each arm of the pair of arms of the neckband, and a second image sensor disposed in the central portion and positioned towards a posterior end of the central portion of the neckband. Further, the wearable electronic device includes a communication interface configured to enable a wireless communication for transmitting and receiving data between the wearable electronic device and a user device associated with a user, and a processor operatively coupled to the communication interface.

The processor is configured to receive a control command through an application associated with the wearable electronic device that is installed in the user device, for capturing the image data of a surrounding environment of the user. Further, the processor is configured to trigger the image sensors for capturing the image data of the surrounding environment of the user in real-time, while the wearable electronic device being worn by the user. More specifically, the control command triggers the first image sensor to capture the image data of a left-side view and a right-side view, and the second image sensor to capture a rear view of the surrounding environment of the user. The image data corresponds to the visual media of the surrounding environment of the user. Further, the processor transmits the image data being captured by the at least one image sensor in real-time, to the user device of the user for enabling the user to view the visual media of the surrounding environment. In other words, the image data being captured in real-time is live-streamed in the application installed in the user device. Additionally, the processor is configured to append audio signals of the surrounding environment captured by a microphone of the wearable electronic device with the image data captured in real-time, prior to transmitting the image data to the user device.

Various embodiments of the present invention are described hereinafter with reference to FIG. 1 to FIG. 7.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a wearable electronic device 106, and a user device 104 (e.g., a mobile phone) associated with a user 102, an application server 110, a database 112, each coupled to, and in communication with (and/or with access to) a network 114. Examples of the user device 104 may include, without limitation, smart phones, tablet computers, other handheld computers, wearable devices, laptop computers, desktop computers, servers, portable media players, gaming devices, and so forth. Further, the wearable electronic device 106 corresponds to a wireless earphones of a neckband configuration for being worn around the neck of the user 102, thereby providing hands-free audio services to the user 102. In an embodiment, the wearable electronic device 106 may be a headset (wired/wireless) to be positioned on the users' head. In another embodiment, the wearable electronic device 106 may be a true wireless earphones/earbuds.

Various entities in the environment 100 may connect to the network 114 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 114 may include a secure protocol (e.g., Hypertext Transfer Protocol (HTTP)), and/or any other protocol, or set of protocols. In an example embodiment, the network 114 may include, without limitation, a light fidelity (Li-Fi) network, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In one embodiment, the user device 104 is equipped with an instance of an application 116. The application 116 is configured to display various graphical user interfaces (GUIs) to the user 102 for controlling the wearable electronic device 106 to provide audio services and capturing of images of the surrounding environment of the user 102 which will be explained further in detail. The application 116 may be hosted and managed by the application server 110. In an embodiment, the application server 110 may provide the application 116, in response to a request received from the user device 104 via the network 114. In another embodiment, the application 116 may be factory-installed on the user device 104. In another embodiment, the user device 104 may access an instance of the application 116 from the application server 110 for installing on the user device 104 using application stores associated with operating systems such as Apple iOS®, Android™ OS, Google Chrome OS, Symbian OS®, Windows Mobile® OS, and the like.

In addition, the application server 110 should be understood to be embodied in at least one computing device in communication with the network 114, which may be specifically configured, via executable instructions, to perform as described herein, and/or embodied in at least one non-transitory computer-readable media.

The wearable electronic device 106 includes at least one image sensor (see, 108 of FIG. 1) for capturing a surrounding environment of the user 102, while the wearable electronic device 106 being worn around the neck of the user 102 which will be explained further in detail. The wearable electronic device 106 (hereinafter interchangeably referred to as 'the device 106') is connected to the user device 104 through wireless communication protocols. Some examples of the wireless communication protocols may be, but not limited to, Bluetooth, near field communication (NFC), wireless fidelity (Wi-Fi), universal radio interface and the like. Therefore, the device 106 provides dual functionalities of both hands-free audio services and image capturing for the user device 104 paired to the wearable electronic device 106.

More specifically, the device 106 is worn around the neck of the user 102 and the earpiece associated with the device 106 is placed in the ear proximate to an auditory canal of the user 102. As such, the application 116 provides an audio file (or audio input signals) to the device 106, thereby enabling the user 102 to hear the music. Additionally, the user 102 enables wireless image capturing by providing a control command in the application 116 installed in the user device 104. Particularly, the control command is transmitted to the device 106 for activating the image sensors 108 for capturing/record image data in the optical path (i.e. the surrounding environment of the user 102) in real-time. In an example, the image sensors 108 may capture images of a rear view, left-side view and right-side view of the user 102 in real-time, as the user 102 moves. Thereafter, the image data captured by the image sensors 108 on the device 106 are processed and transmitted from the device 106 to the application 116 installed in the user device 104. In other words, the image data captured by the image sensors 108 are subsequently displayed (live-streaming) on the user device 104, thus providing awareness of the surrounding environment of the user 102.

In one scenario, the user 102 may wish to watch the captured image data at a later time. In this scenario, the user 102 may provide an input in the application 116 related to receiving and storing the image data captured in real-time. The image data captured in real-time is transmitted, via a communication interface, to a virtual space (or a local database) allocated to the application 116 in the user device 104 for storage and future retrieval. Thus, the user 102 accesses the image data stored in the virtual space at a later time. In an embodiment, the device 106 may transmit the captured image data to the database 112 associated with the application server 110 via the network 114.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
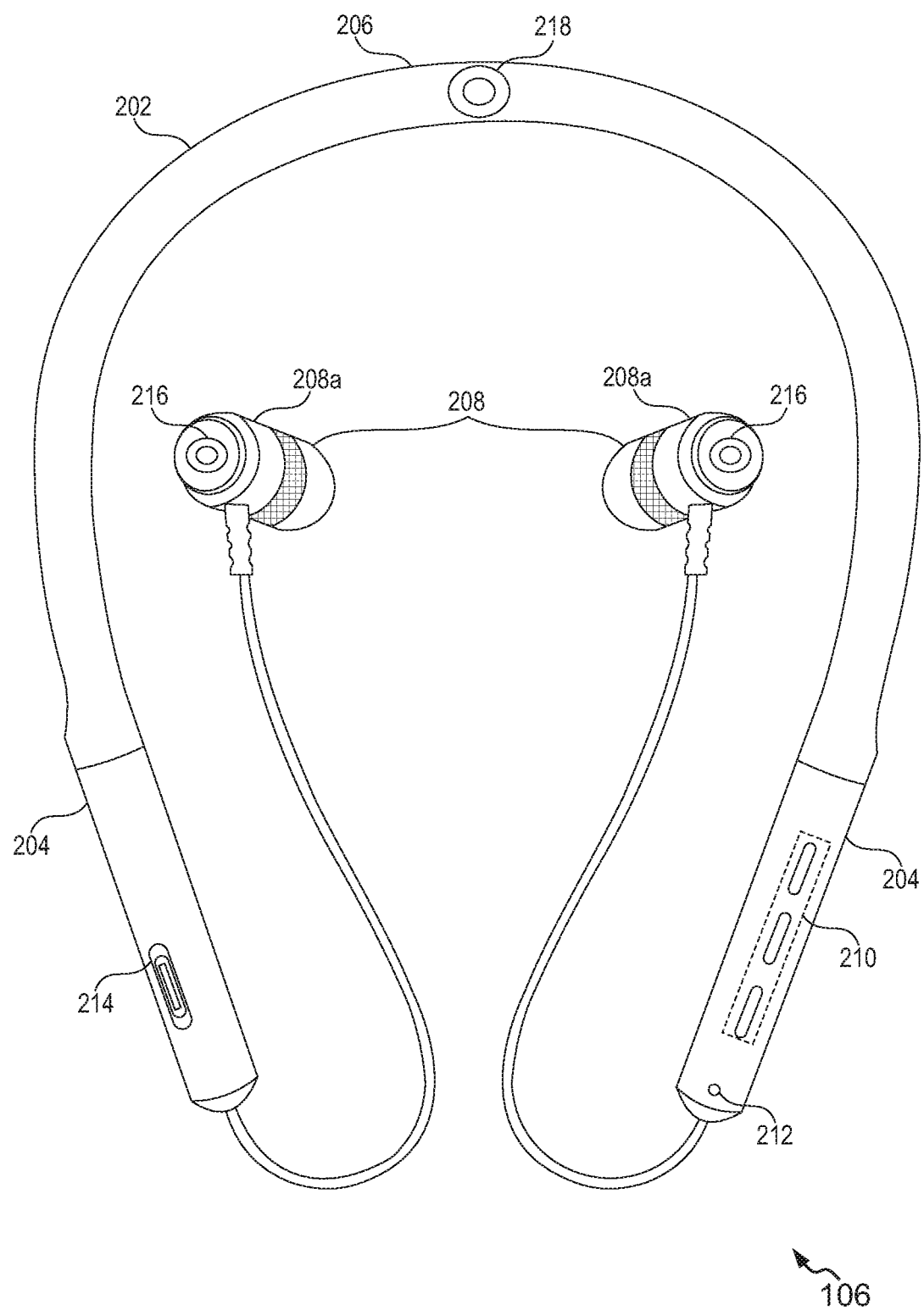
FIG. 2 illustrates a schematic view of a wearable electronic device, in accordance with an example embodiment of the present disclosure.

Referring to FIG. 2 in conjunction with FIG. 1, a schematic view of the wearable electronic device 106 is illustrated. The device 106 includes a neckband 202. The neckband 202 includes a pair of arms 204 connected by a central portion 206 therebetween. As shown in FIG. 2, the neckband 202 is generally U-shaped, where a portion thereof may be positioned at back of a users' neck. The neckband 202 including the pair of arms 204 may be configured with flexible materials. The neckband 202 and the pair of arms 204 has a memory capability, thus the shape of the neckband 202 and the pair of arms 204 may be selectively and dynamically customized by the user 102. This combination of rigidity and flexibility in the neckband 202 provides an adjustable fit that enables the device 106 to be accommodated over the users' neck, irrespective of the size of the neck. In other words, the neckband 202 may be adjusted as needed (i.e. with a looser fit or a snug fit) by the user 102 for securing the device 106 comfortably.

The device 106 further includes earpiece 208 connected to the neckband 202. More specifically, the earpiece 208 are connected to each arm of the pair of arms 204 via cables (as shown in FIG. 2). The earpiece 208 can easily be positioned with respect to a user's ears for providing audio output signals. The earpiece 208 may include high energy neodymium magnets for providing high-bass audio output to the user 102. The device 106 may further include control buttons 210 such as, but are not limited to, volume control buttons, audio playback control, multifunction buttons (for muting/unmuting a microphone 212 during phone calls), and power on/off button (for enabling/disabling Bluetooth visibility for pairing with the user device 104). The microphone may be configured to receive audio signals (or the audio data) continuously, while recording the image data which will be explained with reference to FIG. 3. It should be appreciated that the device 106 may include other components such as a battery or a power source and other processor components that are required for the device 106 to operate. More specifically, the device 106 includes a universal serial bus (USB) 214 for receiving an electrical conductor i.e. charging cable (not shown in Figures) to charge the power source associated with device 106. The device 106 may include one or more Light emitting diode (LED) indicators (not shown in Figures) for showing at least, a charging status, power on/off status, and the like.

As shown in FIG. 2, the device 106 includes the image sensors 108. The image sensors 108 include a first image sensor 216 and a second image sensor 218. The first image sensor 216 is disposed in a housing 208a of the earpiece 208 of each arm of the pair of arms 204 of the neckband 202. In other words, the device 106 may include two image sensors (i.e. the first image sensor 216), one on each earpiece such as the earpiece 108. The second image sensor 218 is disposed in the central portion 206 and positioned towards a posterior end of the central portion 206 of the neckband 202. It is understood that the first image sensor 216 on each of the earpiece 208 (left and right earpiece), and the second image sensor 218 are configured to capture the image data of the left-side view and the right-side view, and the rear view of the user 102, respectively, while the device 106 is being over by the user 102 with the earpiece 208 secured to the users' ear.

In an embodiment, the first image sensor 216 and the second image sensor 218 may be selectively operated by the providing user inputs related to activating the image sensors 108 in the application 116. In this scenario, the user inputs may activate either of the first image sensor 216 or the second image sensor 218 for capturing a scene around the user 102.

In another embodiment, the image sensors 108 may be mounted to the device 106 using an external support (not shown in Figures). In this scenario, the external support may allow the image sensors 108 to pivot/swivel (e.g., 360 degrees) to allow the user 102 to capture the image data in different directions. In one example, the user 102 may pivot the image sensors 108 to record a top-view of the user 102. In another example, the user 102 may point one image sensor (i.e. the first image sensor 216 mounted to the left earpiece 208) forward perspective of the users' head (front-view or users' view) and the other image sensor (i.e. the first image sensor 216 mounted to the right earpiece 208) towards the back (i.e. the rear view). In yet another example, the user 102 may position both image sensors (i.e. the first image sensor 216 mounted to the left and right earpiece) in the same direction, so as to allow a three dimensional (3D) image capturing around the user 102.

The image data recorded in real-time by each of the first image sensor 216 and the second image sensor 218 is wirelessly transmitted to the user device 104 via control electronics associated with the device 106. More specifically, the control electronics of the device 106 may process the image data and the audio data (i.e. A/V data) recorded in real-time and transmit to the user device 104. The one or more components and functionalities of the control electronics is herein explained in detail with reference to FIG. 3. In an embodiment, the captured A/V data may be transmitted via a physical connector (not shown in Figures). The physical connector enables the wired connection between the user device 104 and the device 106 for enabling transmission of the recorded A/V data.

Figure 3:
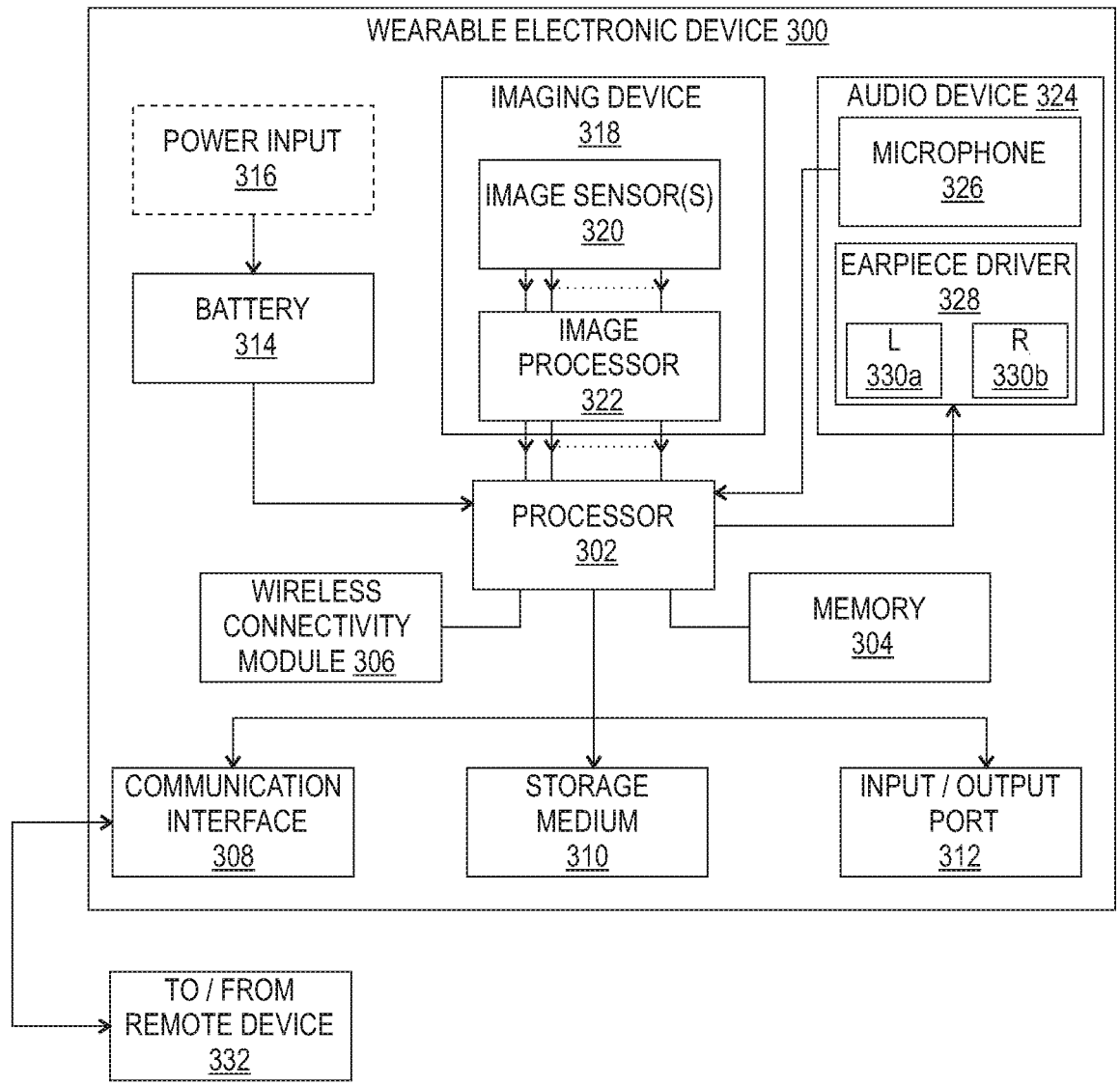
FIG. 3 illustrates a simplified block diagram representation of the wearable electronic device, in accordance with an example embodiment of the present disclosure.

Referring to FIG. 3 in conjunction with FIG. 2, illustrates a simplified block diagram representation of a wearable electronic device 300, in accordance with an exemplary embodiment of the present disclosure. The wearable electronic device 300 is an example of the wearable electronic device 106 as explained with reference to FIGS. 1 and 2. The components of the wearable electronic device 300 provided herein may not be exhaustive and the wearable electronic device 300 may include more or fewer components than those depicted in FIG. 3. Further, two or more components may be embodied in one single component, and/or one component may be configured using multiple sub-components to achieve the desired functionalities.

The wearable electronic device 300 (hereinafter interchangeably referred to as 'the device 300') generally includes the components of the conventional audio wireless earphones. More specifically, the device 300 includes a processor 302 and a memory 304. The processor 302 may be multimedia processor for controlling and/or managing the A/V data. Examples of the processor 302 may be, but are not limited to, an ARM (Advanced RISC (Reduced Instruction Set computer) Machine) processor, DSP processor, distributed processor, an/or other processing units. The memory 304 is configured to store executable instructions. The processor 302 is configured to execute instructions stored in the memory 304 to perform operations such capturing images, recording audio signals, providing audio output and/or other functions.

The processor 302 is operatively coupled to a communication interface 308 such that the device 300 is capable of communicating with remote device 332 such as the user device 104. For example, the communication interface 308 may receive at least the audio file, transmit the recorded AN data, and the like.

The device 300 further includes a wireless connectivity module 306 communicably coupled to the processor 302. The wireless connectivity module 306 corresponds to a wireless transceiver for receiving a wireless signal such as a Bluetooth signal, Wireless-Fidelity (Wi-Fi) or infrared (IR) signals. In other words, the wireless connectivity module 306 enables pairing (a wireless link) of the device 300 with the user device 104. In an embodiment, the wireless connectivity module 306 may include an antenna that is capable of transmitting and receiving wireless communications. For example, the antenna may be a Bluetooth or WiFi antenna, a radio frequency identification (RFID) antenna, a near field communication (NFC) unit, and the like.

Further, the device 300 includes a storage medium 310 communicably coupled to the processor 302. The storage medium 310 may provide a non-volatile local storage, within the device 300, for the recorded real-time A/V data. The recorded real-time A/V data may be stored in the storage medium 310 based on the inputs provided by the user 102 in the application 116 which will be further explained in detail. Examples of the storage medium 310 may be a non-volatile random access memory (NVRAM) such as a NAND flash.

The device 300 includes an input/output port 312, a battery 314 and a power input 316. The input/output port 312 may be facilitate connection for additional peripherals with device 300. For example, the input/output port 312 may be a headphone jack, or may be a data port. The battery 314 may be a battery (i.e. a rechargeable battery) or other power supply capable of powering the device 300. The battery 314 may have a connection port (e.g., a micro USB port) for recharging. More specifically, the power input 316 may be configured to charge the battery 314, thus enabling the operational power to be transmitted to the components of the device 300 for functioning. In an embodiment, the battery 314 may be configured to be charged via inductive charging or any other form of non-direct charging.

The device 300 further includes an imaging device 318 and an audio device 324. The imaging device 318 includes image sensors 320. The image sensors 320 correspond to the image sensors 108 (or the first image sensor 216 and the second image sensor 218). It is understood that the image sensors 320 include a lens for capturing the image data. Examples of the image sensors may include semiconductor charge-coupled devices (CCD), active pixel sensors, complementary metal-oxide-semiconductor (CMOS), or N-type metal-oxide-semiconductor (NMOS, Live MOS), and the like. The image sensors 320 may be configured with many resolution and frequency capabilities. In an example, the image sensors 320 may be capable of recording at a resolution of up to 1920×1080 pixels at a frame rate of up to 60 Hz. In another example, the image sensors 320 may be capable of recording at a resolution of higher than 1920×1080 pixels and at a frame rate of higher than 60 Hz, or at any other standard resolutions and frequencies.

The image sensors 320 are configured to capture the image data to the left, right and rear views of the user 102 in real-time based on receipt of the control command from the user device 104. In other words, the image sensors 320 are configured to detect and convert optical signals in the near-infrared, infrared, visible, and ultraviolet spectrums into electrical signals. The electrical signals may be used to form an image or a video stream (i.e. the image data). In one example scenario, the image sensors 320 may be configured to provide the image data corresponding to an MPEG (Motion Picture Experts Group) standard or any other digital video compression standards. The image data corresponds to a visual media of the surrounding environment of the user. Additionally, the imaging device 318 includes an image processor 322. The image processor 322 is configured to receive the optical signals captured at different views (i.e. left, right and rear views) by the image sensors 320 and process the optical signals, prior to transmitting the image data to the user device 104. For example, the image processor 322 receives the image data captured by the first image sensor 216 disposed in both the earpiece, and process the image data into single stream which will be displayed on the user device 104. In an embodiment, the processor 302 may be configured to process the image data captured by the image sensors 320, and transmit the processed image data to the user device 104.

Further, the audio device 324 includes a microphone 326 and earpiece driver 328. The microphone 326 is configured for recording audio data (or the audio signals) of the surrounding environment to be combined with the captured real-time image data. Subsequently, the recorded audio data are transmitted to the processor 302 for appending to the image data recorded in real-time by the image sensors 320 (or the image sensors 108). Additionally, the microphone 326 may be shared between the image capturing functions and conventional hands-free telecommunication functions. Further, the earpiece driver 328 include one or more electronic circuitry that is configured to provide audio output signals through an earpiece 330a and an earpiece 330b. The earpiece 330a and 330b are corresponds to a left earpiece (denoted by letter 'L') and a right earpiece (denoted by letter 'R'), respectively. The earpiece driver 328 functions as conventional hands-free earphones for providing audio output signals to the user 102, when the earpiece are placed in the users' ear.

Upon capturing the A/V data, the processor 302 transmits the A/V data to the user device 104 via the communication interface 308. In one scenario, the processor 302 is configured to live-stream the audio data and the image data in the application 116 installed in the user device 104, for enabling the user 102 to view different views (e.g., left, right and rear views) around the user 102 without the need to turn around. As explained above, the A/V data captured in real-time are displayed as a single video stream on a user interface in the application 116 installed in the user device 104. In another scenario, the user 102 may provide an input related to storage of the image data appended with the audio data recorded in real-time in a virtual space allocated to the application 116 in the user device 104. The virtual space corresponds to a memory location in a local database of the user device 104. In this scenario, the processor 302 transmits the image data appended with the audio data to the user device 104 for storage and future retrieval. Particularly, the image data appended with the audio data is stored in the virtual space allocated to the application 116 in the user device 104. As such, the user 102 may access the stored data in the virtual space by providing inputs in the application 116. In an embodiment, the image data captured in real-time may be transmitted to the user device 104 devoid of the audio data to reduce file size of the captured data.

In one case, the user 102 may provide the control command for a multiple times to record the A/V data around the user 102 at different time instants of day. In this case, the A/V data recorded in real-time is stored in the local database of the user device 104 with time stamp associated with each of the A/V data captured in the particular time instant of the day. The time stamp may include a start time and an end time of the recording session, and a date.

In an embodiment, the captured A/V data may be stored in a local storage (i.e. the storage medium 310) of the device 300. In one example scenario, the storage medium 310 provides a non-volatile data buffer to store the A/V data captured in real-time, based on receipt of the user input related to storage of the recorded content. Further, the stored A/V data is transmitted from the storage medium 310 to the user device 104 based upon receipt of the user inputs form the application 116 as explained above. In another example scenario, the storage medium 310 may provide the non-volatile data buffer to store the A/V data, as it is streamed from the processor 302 on the user device 104. In this scenario, the A/V data may be erased from the storage medium after a predefined threshold-time (e.g., after 24 hours). In an example embodiment, the processor 302 may transmit the recorded A/V data to an external database such as the external database 112 via the network 114.

Figure 4:
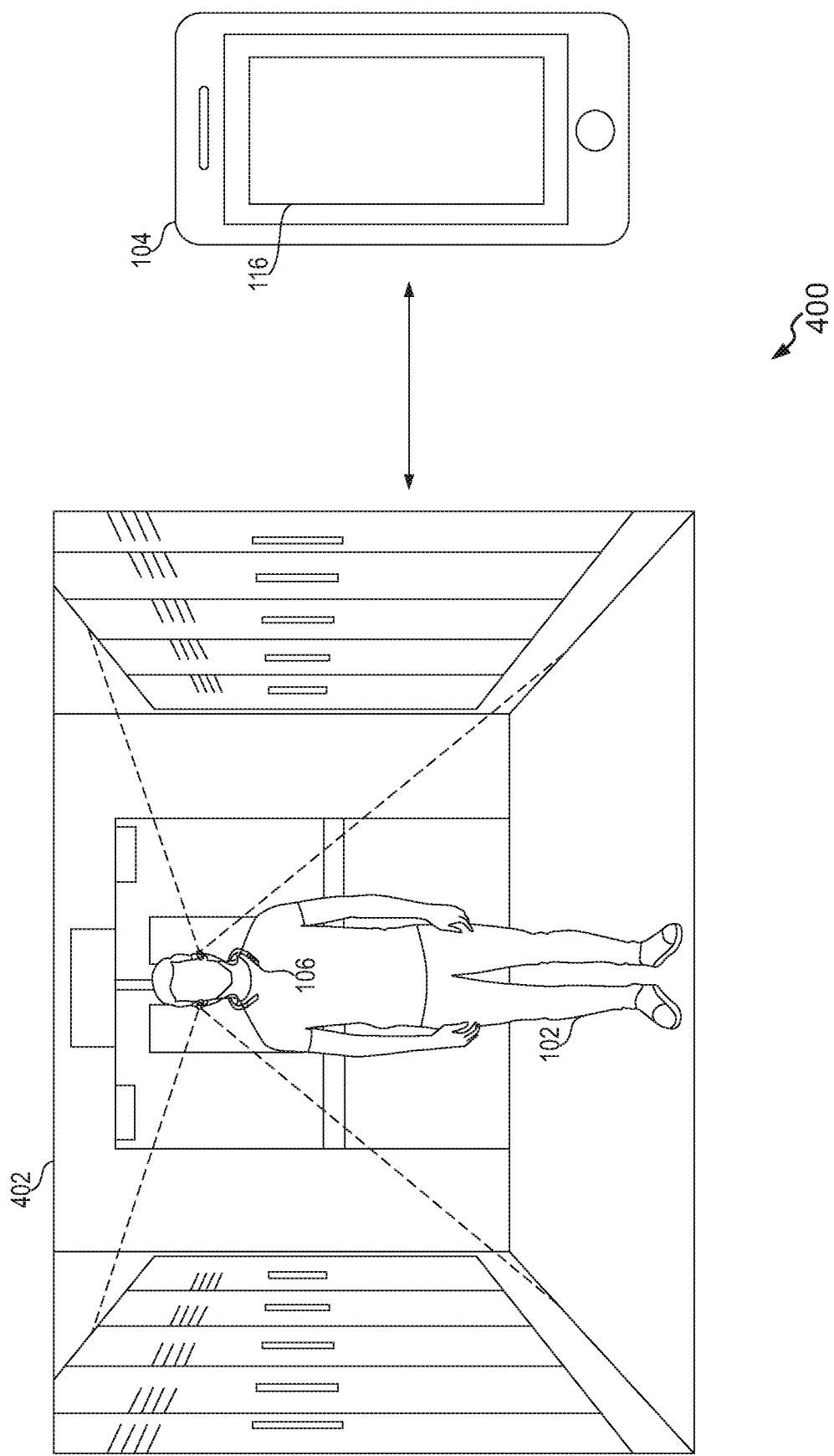
FIG. 4 illustrates an example scenario of capturing a visual media around a user when the wearable electronic device is worn around the users' neck, in accordance with an example embodiment of the present disclosure.

FIG. 4 illustrates an example scenario 400 of capturing a scene (or visual media) around the user, is shown in accordance with an example embodiment of the present disclosure. For example, the image data 402 may include a passage (or a corridor) and a door is captured. As shown in FIG. 4, the user 102 is wearing the wearable electronic device 106 or the device 300 around the neck and the earpiece 208 placed in the user's ear. In this scenario, an image data 402 of the scene around the user 102 (or the surrounding environment of the user 102) is captured by the image sensors 320 (or the first image sensor 216 on both the earpiece and the second image sensor 218) of the device 300, as the user 102 traverses in the passage. More specifically, the image data 402 includes a left-side view, a right-side view and a rear view of the user 102 (as shown in FIG. 4). Further, the user device 104 communicably coupled with the device 106 is configured to receive the captured image data 402 in real-time via the communication interface 308 as explained with reference to FIG. 3. Further, the user device 104 may provide audio file to the device 106 as explained above.

Figure 5A:
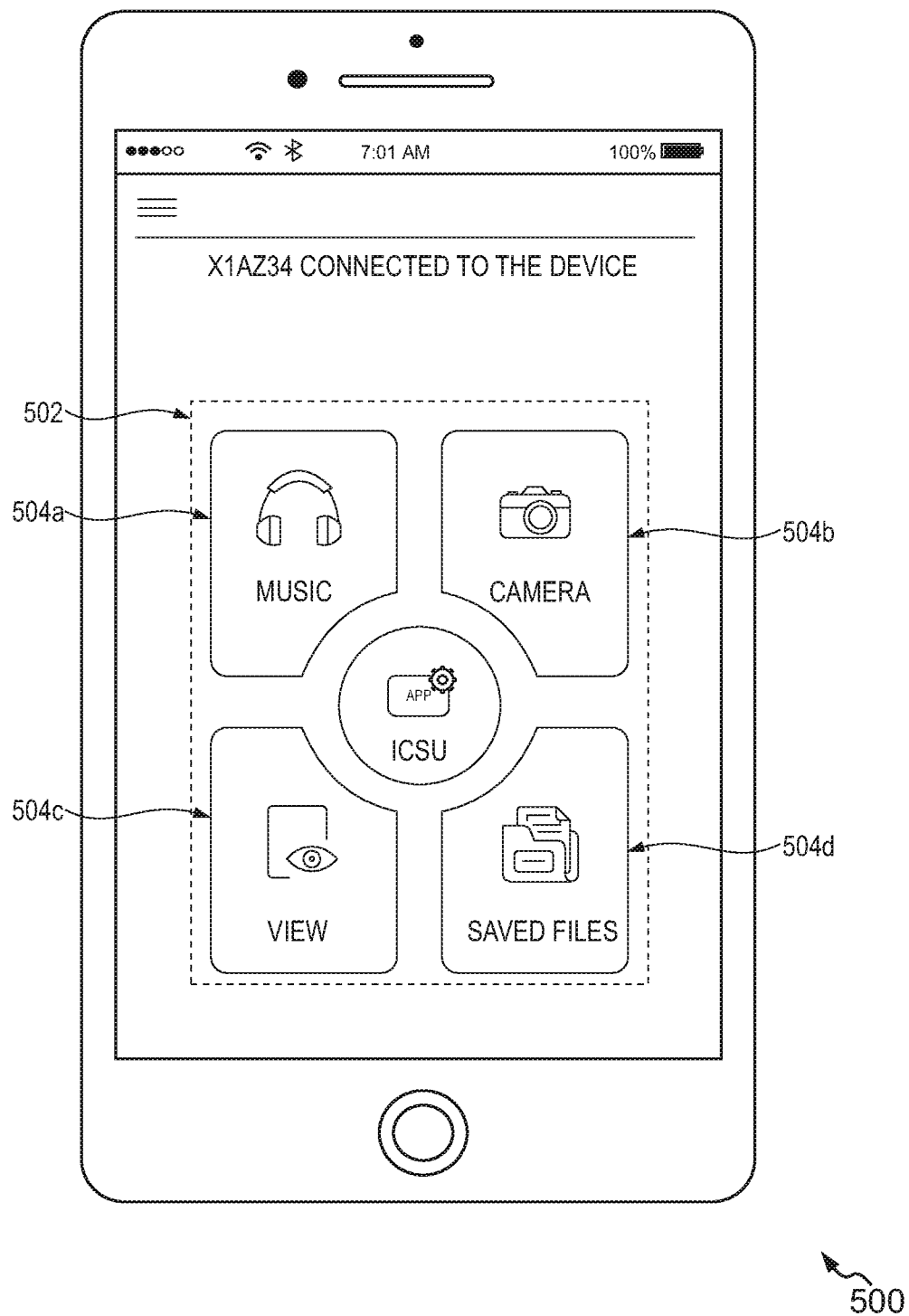
FIGS. 5A, 5B and 5C represent example representations of user interfaces (UIs) displayed to a user for controlling the wearable electronic device and viewing a recorded content, in accordance with an embodiment of the present disclosure.
Figure 5B:
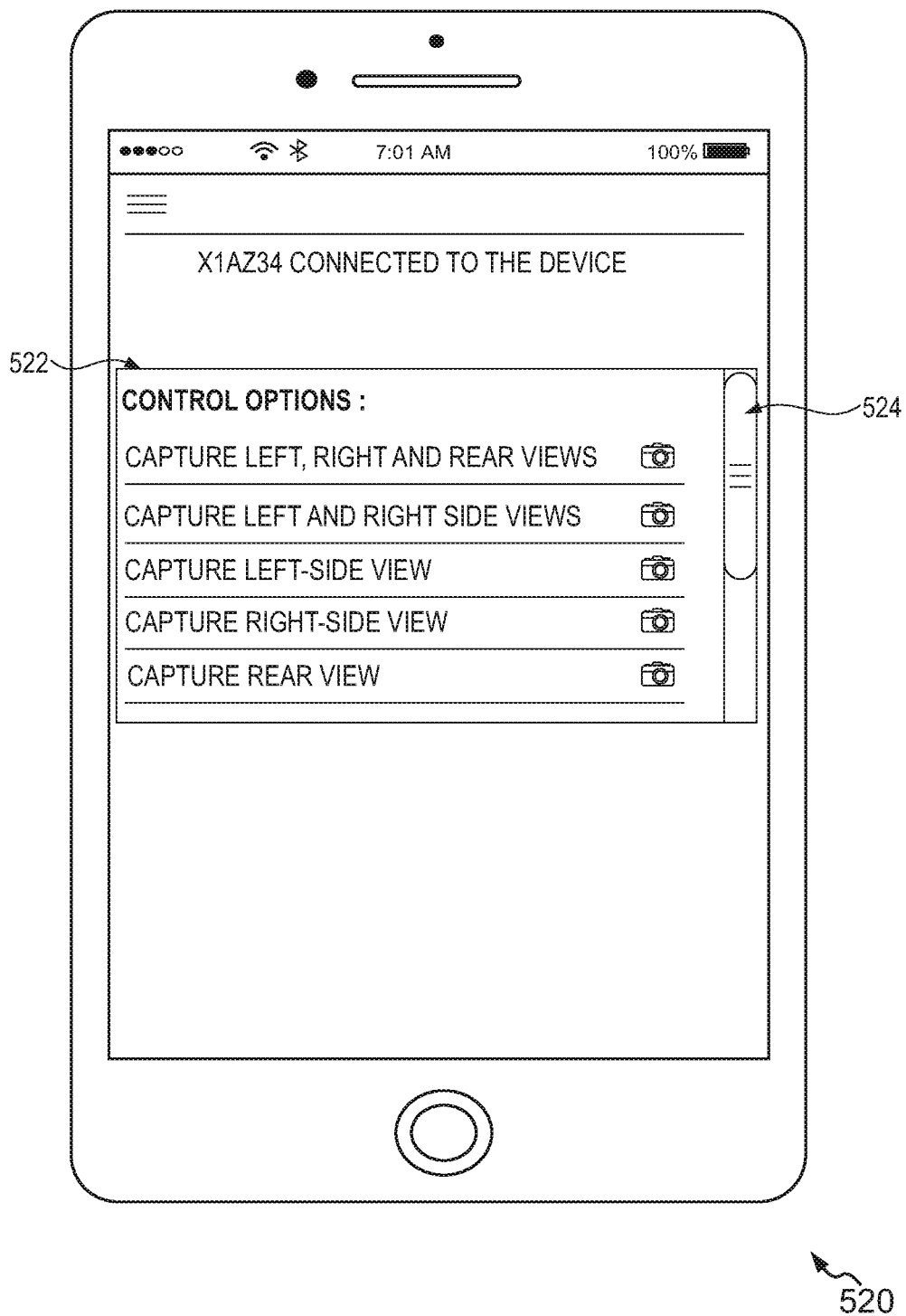
Figure 5C:
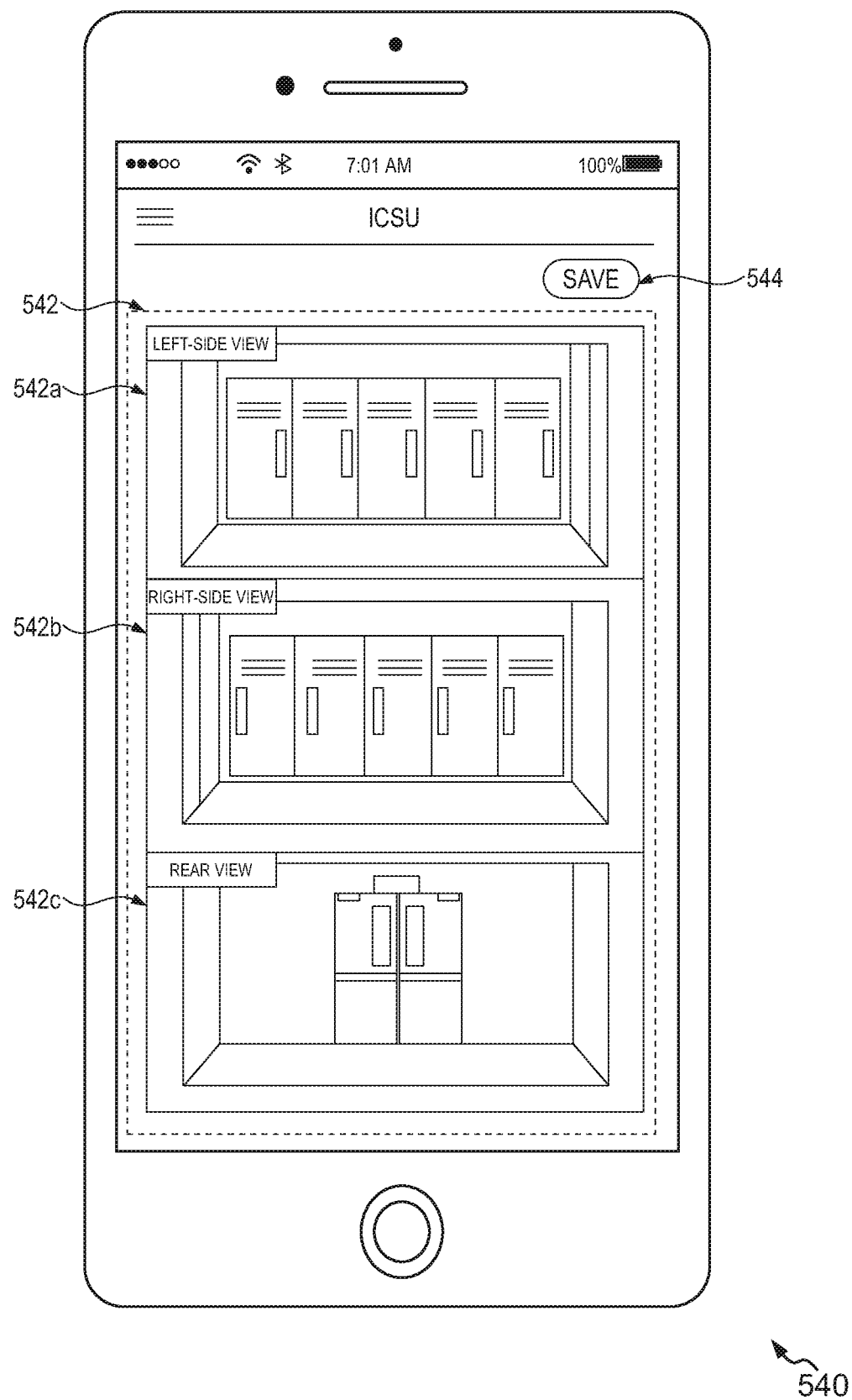

FIGS. 5A, 5B and 5C collectively, represent example representation of user interfaces (UIs) displayed to a user for controlling the device 106 and viewing the recorded content, in accordance with an embodiment of the present disclosure.

Referring to FIG. 5A, a representation of a user interface (UI) 500, depicting a list of options for user selection, is shown in accordance with an embodiment of the present disclosure. The UI 500 renders depicts a list of options 502 associated with the application 116 for controlling the device 106 (or the device 300). The UI 500 may be depicted to the user 102 based upon providing user credentials (e.g., user-name and password) for logging in to the application 116. The UI 500 is further depicted to include the device name (i.e. the device 106) connected/paired to the user device 104 (exemplarily depicted to be 'X1AZ34 connected to the device'). The list of options 502 includes an option 504a, an option 504b, an option 504c, and an option 504d. The options 504a-504d are associated with the text 'MUSIC', 'CAMERA', 'VIEW', and 'SAVED FILES', respectively. The user 102 may select the option 504a for listening wireless audio through the earpiece 208 of the device 106. More specifically, the user 102 may be rendered with an UI depicting the audio files stored in the local database of the user device 104 (not shown in Figures). The user 102 may select an audio file that will be played by the device 106.

Further, the user 102 may provide input related to triggering the image sensors 108 (or the image sensors 320) by selecting the option 504b. Based on user selection of the option 504b, the user 102 is directed to a UI 520 (as shown in FIG. 5B). The UI 520 is depicted to include a plurality of control options 522 for controlling or triggering the image sensors 108 of the device 106 for capturing the different views around the user 102 (as shown in FIG. 5B). The control options 522 may be predefined by the application server 110 for capturing a particular view around the user 102. The control options 522 are exemplarily depicted to be 'capture left, right and rear views', 'capture left and right side views', 'capture left-side view', 'capture right-side view', and 'capture rear view' (as shown in FIG. 5B). Further, the user 102 may access other control options from the control options 522 by providing input on a slide bar 524 (as shown in FIG. 5B). For instance, the user 102 may select the option 'capture left, right and rear views' of the user 102. In this scenario, the application 116 sends the control command associated with the selected control option to the device 106 for trigging the image sensors 108 (or the first and second image sensors 216 and 218) for capturing the left-side view, the right-side view and the rear view of the user 102.

Referring to FIG. 5C, a representation of a user interface (UI) 540, depicting live-streaming of A/V data, is shown in accordance with an embodiment of the present disclosure. The UI 540 is depicted to the user 102 based on user selection of the option 504c. The UI 540 is depicted to include one or more windows 542 for depicting the image data captured by the image sensors 108 in real-time. The number of windows 542 depicted in the UI 540 depends on the user selection of the control option from the UI 520. As shown in FIG. 5C, the UI 540 is depicted to include three windows such as, 542a, 542b and 542c for depicting the left-side view, the right side-view and the rear view of the surrounding environment of the user 102. For example, the windows 542a, 542b and 542c depicts the left-side view, the right-side view and the rear view of the image data 402 captured around the user 102 by the image sensors 216 and 218 as shown in FIG. 4. Further, the user 102 may hear the audio data that is appended with the image data through output devices (e.g., speaker) of the user device 104 or wirelessly through the earpiece 208. Additionally, the user 102 may save the live-streaming image and audio data by providing input on a button 544 associated with the text 'SAVE'. The image and audio data may be saved in the local database of the user device 104 as explained above. In an embodiment, the image data and the audio data may be saved in the local database of the user 102 based on receipt of the input related to storage of the A/V data as explained with reference to FIG. 3. Further, the user 102 can access the saved files for viewing the recorded A/V data by providing input on the option 504d in the UI 500.

Figure 6:
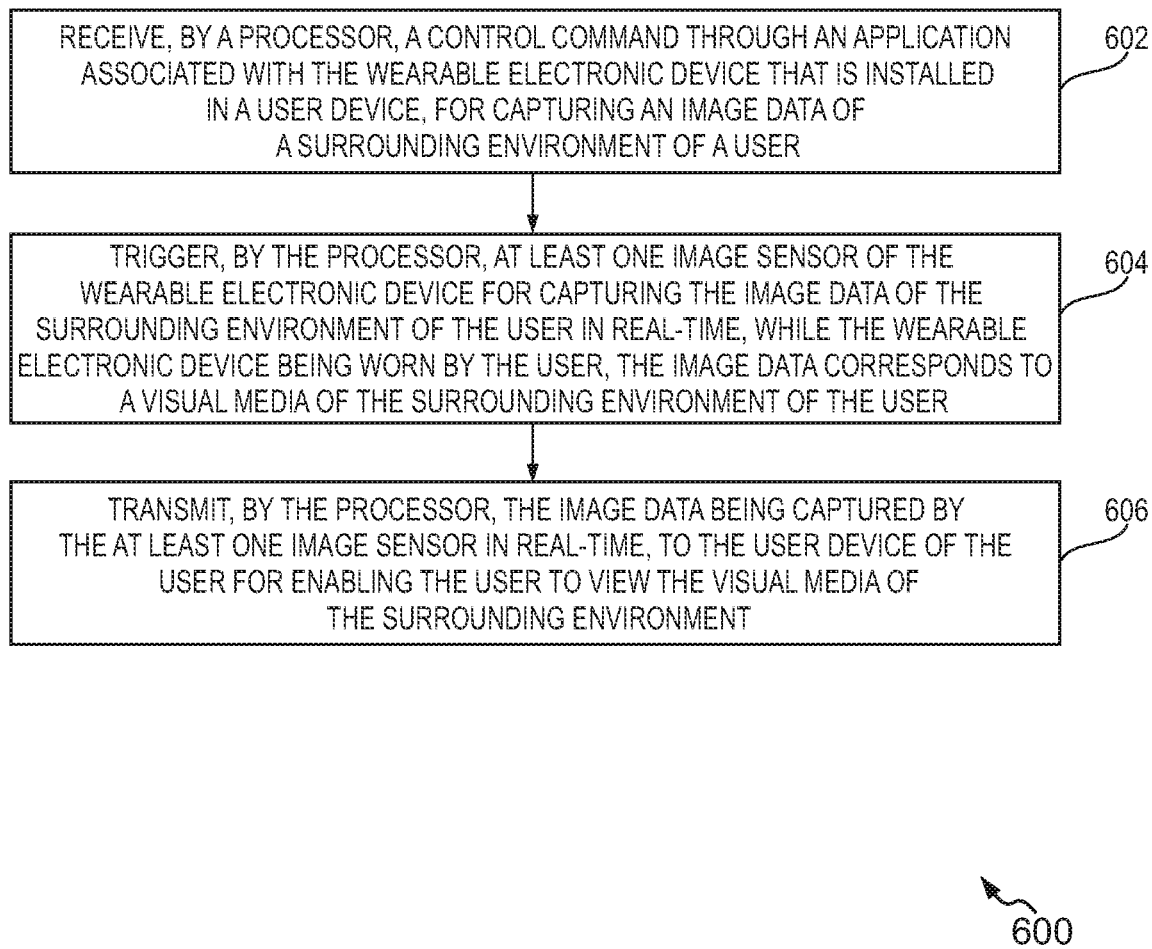
FIG. 6 illustrates a flow diagram of a method for controlling the wearable electronic device, in accordance with an embodiment of the present disclosure.

FIG. 6 illustrates a flow diagram of a method 600 for controlling a wearable electronic device such as, the wearable electronic device 106 (or the device 300), in accordance with an embodiment of the present disclosure. The method 600 depicted in the flow diagram may be executed by, for example, a processor 302 of the wearable electronic device 300. Operations of the flow diagram of method 600, and combinations of operation in the flow diagram of method 600, may be implemented by, for example, hardware, firmware, a processor, circuitry, and/or a different device associated with the execution of software that includes one or more computer program instructions. It is noted that the operations of the method 600 can be described and/or practiced by using a system other than these server systems. The method 600 starts at operation 602.

At operation 602, the method 600 includes receiving, by a processor, a control command through an application associated with the wearable electronic device that is installed in a user device, for capturing an image data of a surrounding environment of a user.

At operation 604, the method 600 includes triggering, by the processor, at least one image sensor of the wearable electronic device for capturing the image data of the surrounding environment of the user in real-time, while the wearable electronic device being worn by the user. The image data corresponds to a visual media of the surrounding environment of the user.

At operation 606, the method 600 includes transmitting, by the processor, the image data being captured by the at least one image sensor in real-time, to the user device of the user for enabling the user to view the visual media of the surrounding environment.

Figure 7:
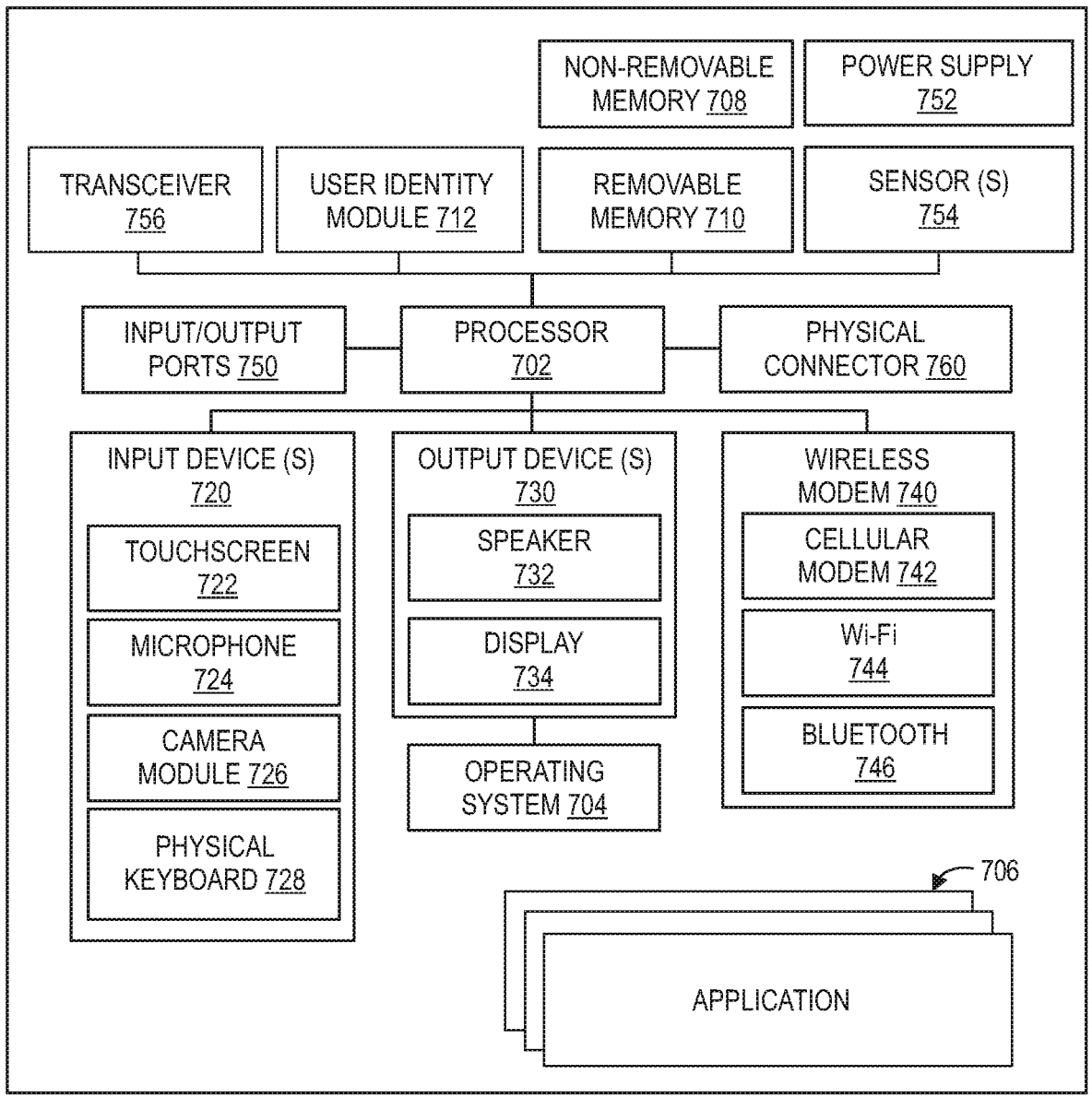
FIG. 7 is a simplified block diagram of an electronic device capable of implementing various embodiments of the present disclosure.

FIG. 7 is a simplified block diagram of an electronic device 700 capable of implementing various embodiments of the present disclosure. For example, the electronic device 700 may correspond to the user device 104 of FIG. 1. The electronic device 700 is depicted to include one or more applications 706. For example, the one or more applications 706 may include the application 116 of FIG. 1. The application 116 can be an instance of an application downloaded from the application server 110.

It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an embodiment may include more, less or different components than those described in connection with the embodiment of the FIG. 7. As such, among other examples, the electronic device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and supports for one or more operations of the application (see, the applications 706), such as the application 116 that implements one or more of the innovative features described herein. In addition, the applications 706 may include common mobile computing applications (e.g., telephony applications, email applications, calendars, and contact managers, web browsers, messaging applications) or any other computing application.

The illustrated electronic device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700 and biometric sensors for scanning biometric identity of an authorized user, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

One or more operations of the application server 110 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry). Particularly, the application server 110 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A wearable electronic device for providing audio output and capturing a visual media, the wearable electronic device comprising:
   a neckband comprising a pair of arms coupled by a central portion there between, each arm of the pair of arms comprising an earpiece for providing audio output signals;
   a first image sensor and a second image sensor, wherein the first image sensor is disposed in a housing of the earpiece of each arm of the pair of arms of the neckband and the second image sensor is disposed in the central portion and positioned towards a posterior end of the central portion of the neckband;
   a communication interface configured to enable a wireless communication for transmitting and receiving data between the wearable electronic device and a user device associated with a user; and
   a processor operatively coupled to the communication interface, the processor configured to at least:
      receive a control command through an application associated with the wearable electronic device that is installed in the user device, for capturing the image data of a surrounding environment of the user,
      based on receipt of the control command, trigger the first image sensor and the second image sensor for capturing the image data of the surrounding environment of the user in real-time using the first image sensor and the second image sensor to capture a three dimensional view of the surroundings by pivoting the first image sensor and the second image sensor in the respective direction, while the wearable electronic device being worn by the user, the image data corresponds to the visual media of the surrounding environment of the user, and
      transmit via the communication interface, the image data being captured by the first image sensor and the second image sensor in real-time to the user device of the user for enabling the user to view the visual media of the surrounding environment; and
      provide a user input related to saving of the image data recorded in real-time in a virtual space in the user device with the displayed image data.

2. The wearable electronic device as claimed in claim 1, wherein the at least one image sensor further comprises:
   a first image sensor disposed in a housing of the earpiece of each arm of the pair of arms of the neckband; and
   a second image sensor disposed in the central portion and positioned towards a posterior end of the central portion of the neckband.

3. The wearable electronic device as claimed in claim 2, wherein based on receipt of the control command, the first image sensor is configured to capture the image data of a left-side view and a right-side view, and the second image sensor is configured to capture a rear view of the surrounding environment of the user, while the wearable electronic device is being worn by the user.

4. The wearable electronic device as claimed in claim 3, wherein each of the first image sensor and the second image sensor of the at least one image sensor is selectively operated for capturing either of the left-side view, the right-side view and the rear view of the surrounding environment of the user based, at least in part, on the user inputs in the application related to activation of the at least image sensor.

5. The wearable electronic device as claimed in claim 1, further comprising:
   a microphone configured to record audio signals of the surrounding environment of the user.

6. The wearable electronic device as claimed in claim 5, wherein the processor is further configured to at least:
   append subsequently the audio signals of the surrounding environment with the image data recorded in real-time by the at least one image sensor; and
   transmit via the communication interface, the image data appended with the audio signals to the user device of the user.

7. The wearable electronic device as claimed in claim 6, wherein the processor is further configured to at least:
   receive an input related to storage of the image data appended with the audio signals recorded in real-time; and
   transmit via the network interface, the image data appended with the audio signals recorded in real-time for storage and future retrieval, the image data appended with the audio signals is stored in a virtual space allocated to the application in the user device.

8. The wearable electronic device as claimed in claim 1, wherein the processor is further configured to provide the audio output signal through the earpiece based upon receiving an audio file from the user device.

9. A method for controlling a wearable electronic device, the method comprising:
   receiving, by a processor, a control command through an application associated with the wearable electronic device that is installed in a user device, for capturing an image data of a surrounding environment of a user;
   based on receipt of the control command, triggering, by the processor, a first image sensor and a second image sensor, wherein the first image sensor is disposed in a housing of the earpiece of each arm of the pair of arms of the neckband and the second image sensor is disposed in the central portion and positioned towards a posterior end of the central portion of the neckband of the wearable electronic device for capturing the image data of the surrounding environment of the user in real-time using the first image sensor and the second image sensor to capture a three dimensional view of the surroundings by pivoting the first image sensor and the second image sensor in the respective direction, while the wearable electronic device being worn by the user, the image data corresponds to a visual media of the surrounding environment of the user;
   transmitting, by the processor, the image data being captured by the first image sensor and the second image sensor in real-time, to the user device of the user for enabling the user to view the visual media of the surrounding environment; and
   provide a user input related to saving of the image data recorded in real-time in a virtual space in the user device with the displayed image data.

10. The method as claimed in claim 9, wherein the at least one image sensor comprises a first image sensor and a second image sensor, and wherein based on receipt of the control command, the first image sensor is configured to capture the image data of a left-side view and a right-side view, and the second image sensor is configured to capture the image data of a rear view of the surrounding environment of the user, while the wearable electronic device is being worn by the user.

11. The method as claimed in claim 9, further comprising:
   receiving, by the processor, audio signals of the surrounding environment of the user captured by a microphone of the wearable electronic device;
   appending subsequently, by the processor, the audio signals of the surrounding environment with the image data captured in real-time; and
   transmitting, by the processor, the image data appended with the audio signals to the user device of the user.

12. The method as claimed in claim 11, further comprising:
   receiving, by the processor, an input related to storage of the image data appended with the audio signals recorded in real-time; and
   transmitting via the network interface, the image data appended with the audio signals recorded in real-time for storage and future retrieval, the image data appended with the audio signals is stored in a virtual space allocated to the application in the user device.

13. The method as claimed in claim 9, further comprising:
   providing, by the processor, an audio output signal through earpiece of the wearable electronic device based upon receiving an audio file from the user device.

14. A wearable electronic device for providing audio output and capturing a visual media, the wearable electronic device comprising:
   a neckband comprising a pair of arms coupled by a central portion there between, each arm of the pair of arms comprising an earpiece for providing an audio output signal;
   a first image sensor disposed in a housing of the earpiece of each arm of the pair of arms of the neckband, and a second image sensor disposed in the central portion and positioned towards a posterior end of the central portion of the neckband;
   a communication interface configured to enable a wireless communication for transmitting and receiving data between the wearable electronic device and a user device associated with a user; and
   a processor operatively coupled to the communication interface, the processor configured to at least:
      receive a control command through an application associated with the wearable electronic device that is installed in the user device, for capturing the image data of surrounding environment of the user,
      based on receipt of the control command, trigger the first image sensor and the second image sensor for capturing the image data of the surrounding environment of the user in real-time using the first image sensor and the second image sensor to capture a three dimensional view of the surroundings by pivoting the first image sensor and the second image sensor in the respective direction, while the wearable electronic device being worn by the user, the image data corresponds to the visual media of the surrounding environment of the user,
      transmit via the communication interface, the image data being captured by the at least one image sensor in real-time, to the user device of the user for enabling the user to view the visual media of the surrounding environment; and provide a user input related to saving of the image data recorded in real-time in a virtual space in the user device with the displayed image data.

15. The wearable electronic device as claimed in claim 14, wherein based on receipt of the control command, the first image sensor is configured to capture the image data of a left-side view and a right-side view, and the second image sensor is configured to capture a rear view of the surrounding environment of the user, while the wearable electronic device is being worn by the user.

16. The wearable electronic device as claimed in claim 15, wherein each of the first image sensor and the second image sensor of the at least one image sensor is selectively operated for capturing either of the left-side view, the right-side view and the rear view of the surrounding environment of the user based, at least in part, on the user inputs in the application related to activation of the at least image sensor.

17. The wearable electronic device as claimed in claim 14, further comprising: a microphone configured to record audio signals of the surrounding environment of the user.

18. The wearable electronic device as claimed in claim 17, wherein the processor is further configured to at least:

append subsequently the audio signals of the surrounding environment with the image data recorded in real-time by the at least one image sensor; and transmit via the communication interface, the image data appended with the audio signals to the user device of the user.

19. The wearable electronic device as claimed in claim 18, wherein the processor is further configured to at least:

receive an input related to storage of the image data appended with the audio signals recorded in real-time; and transmit via the network interface, the image data appended with the audio signals recorded in real-time for storage and future retrieval, the image data appended with the audio signals is stored in a virtual space allocated to the application in the user device.

20. The wearable electronic device as claimed in claim 14, wherein the processor is further configured to provide the audio output signal through the earpiece based upon receiving an audio file from the user device.

* * * * *